Sept. 12, 1944. H. V. HERMANSEN 2,358,127
FREQUENCY MEASURING APPARATUS
Filed Dec. 17, 1941

INVENTOR.
HENRY V. HERMANSEN
BY Joseph Q. Stansfield
ATTORNEY.

Patented Sept. 12, 1944

2,358,127

UNITED STATES PATENT OFFICE 2,358,127

FREQUENCY MEASURING APPARATUS

Henry V. Hermansen, Baltimore, Md., assignor to Bendix Aviation Corporation, South Bend, Ind., a corporation of Delaware Application December 17, 1941, Serial No. 423,363

7 Claims. (Cl. 250—39)

This invention relates to oscillatory systems and more particularly to oscillator circuits incorporating a visual beat frequency indicator for comparing the frequency of the oscillations with the frequency of externally generated alternating voltages.

One of the most precise methods of determining an unknown output frequency is to combine that frequency with a known frequency from a calibrated source of energy to produce beats. The known frequency may then be varied until a zero beat is obtained, at which time the output frequency from the two sources is equal. Conversely, the unknown frequency may be varied until zero beat is obtained, thus adjusting the unknown source to provide a frequency equal to that derived from the standard calibrated source.

The detection of the zero beat is often performed by an electro-acoustic transducer, such as a telephone headset, connected to a point in the circuit where the two frequencies have been combined. A serious deficiency in the accuracy of settings performed with the aid of such transducers is occasioned by the rapid drop in transducing efficiency at very low frequencies. Beats of the order of two or three per second are beyond detection.

A satisfactory solution has been developed for those applications where a great amount of power is available at each of the two frequencies, for it is only necessary to add the voltages at the two frequencies and pass the resultant into a rectifier whose direct current output electrodes are connected to a direct current meter of the D'Arsonval type. The deflection of the meter swings slowly back and forth at the difference frequency between the two sources of energy. This answer, while satisfactory for installations where large amounts of power are available, still leaves unsolved the problem of supplying equally accurate indications, where smaller amounts of power are available, without bulky and expensive amplifiers.

One of the principal objects of this invention is to provide improved apparatus for visually detecting low beat frequencies.

Another object of this invention is to provide apparatus combining the active elements of an oscillator and a beat frequency indicator to reduce the bulk and weight of frequency measuring apparatus.

Still another object of this invention is to provide improved apparatus for detecting low beat frequencies between a low power source of energy and a standard source of frequency.

The above objects and advantages of this invention are accomplished by utilizing an indicator of the variable shadow area type to respond to plate current variations in any of the well known types of oscillator circuits. This has enabled the use of a single commercially available tube to perform both the function of oscillation generator and beat frequency indicator.

Other objects and advantages will in part be disclosed and in part be obvious when the following specification is read in conjunction with the drawing in which.

Figure 1:
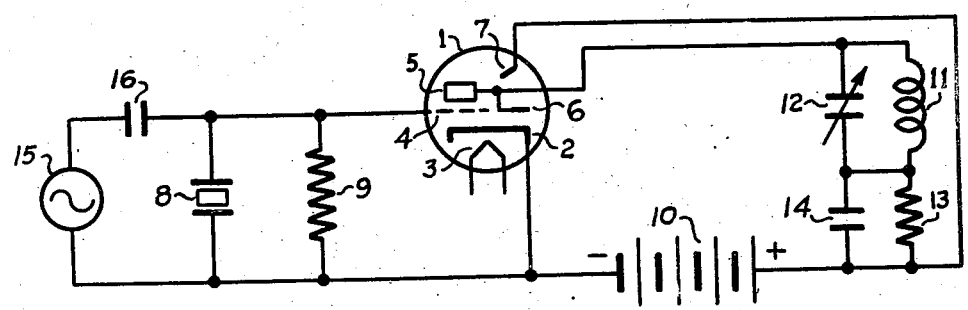
Figure 1 is a schematic diagram of a preferred form of the invention.

It is to be understood that this drawing is intended to illustrate some of the many forms in which the invention may be utilized and is not to comprise a limitation in the content or scope of the invention.

In the drawing, like parts are designated by like reference characters.

Referring to Figure 1, the vacuum tube 1 includes the cathode 2 with the thermally associated heater 3. One portion of the cathode 2 provides emission for the set of elements comprising the control grid 4 and the anode 5, the combination constituting the familiar triode. Another portion of the cathode 2 provides emission for the set of elements including the ray control electrode 6 and the phosphor coated target 7, the combination comprising a well known type of visual electronic indicator. The vacuum tube known commercially as type 6E5 contains all of the above elements and has been successfully employed in the practice of the invention. In present day vacuum tubes of this type, the target 7 surrounds the cathode 2 and is an annularly shaped piece of metal which is dished in form, so that electrons leaving the cathode normally will strike the inner surface which may be readily viewed from the large end of the dish. The inner surface of the target is coated with a material which glows under the impact of electrons, commonly known as a phosphor. The ray control electrode 6 is a small rod located between the cathode and the target. When the ray control electrode is made negative, electrons are excluded from the arc sector under its control, while, when made positive, the ray control electrode permits passage of electrons to all parts of the target. Thus, as the ray control electrode is made more negative, a larger and larger sector of the glowing phosphor is thrown into shadow, since the electrons are excluded from a larger and larger sector through the action of the ray control electrode.

Returning again to Figure 1, the piezo-electric resonator 8 is connected between the control grid 4 and the cathode 2 in parallel with the grid leak resistor 9, which may be of one megohm. The cathode 2 is also connected to the negative terminal of source 10 which may have a potential of 200 volts, and the phosphor coated target 7 is connected to the positive terminal of the source 10. The anode 5 of the vacuum tube 1 is connected within the tube to the ray control electrode 6 and is also connected to the positive terminal of source 10 through the parallel resonant circuit comprising inductance 11 and variable capacitance 12 in series with the voltage dropping resistor 13, which may have a resistance of 500,000 ohms. The bypass capacitor 14 provides a low impedance path for the radio frequency component of the anode current around the resistor 13, but presents a relatively high impedance to audio and sub-audio frequencies. A suitable value for this capacitor is .01 mfd. The source 15 having a frequency which is to be determined or adjusted may be connected to the grid circuit of the triode through the capacitor 16 of 5 mmfd. Since heater circuits of many varieties are well known to those skilled in the art, the source of heater energy and the connections thereto have been omitted from this and the remaining figures.

Neglecting the source 15 for the moment, the triode section of the vacuum tube 1 in this circuit operates as the usual crystal oscillator in which the parallel resonant circuit is tuned to a frequency somewhat higher than the natural resonance frequency of the resonator 8 to produce self-oscillation. In an oscillator of the self-biased grid leak type, it is well known that a drop in anode current accompanies a decrease in the load on the oscillating circuit, while an increase in anode current accompanies an increase in the load on the oscillating circuit. With the source 15 connected as shown and supplying a frequency differing from the crystal frequency the load on the crystal oscillator is decreased as the energy from the source 15 passes through phase opposition with the crystal energy, and the load is increased as the energy from the source 15 passes through phase coincidence with the crystal energy. These variations in loading cause variations in the oscillator anode current at a frequency equal to the difference between the two frequencies, which will be referred to as the beat frequency, and the anode current variations produce a periodic voltage across the resistor 13, at the beat frequency. Because of the direct connection between the anode 5 and the ray control electrode 6, the beat frequency also appears on the ray control electrode and results in a corresponding periodic fluctuation in the width of the shadow sector on the target 7. Source 15 may now be set to isochronism with the crystal oscillating frequency by adjusting it so that the shadow angle fluctuations cease, at which time the frequencies are identical. The great advantage of this method is that there is no lower frequency limit of observation.

Figure 2:
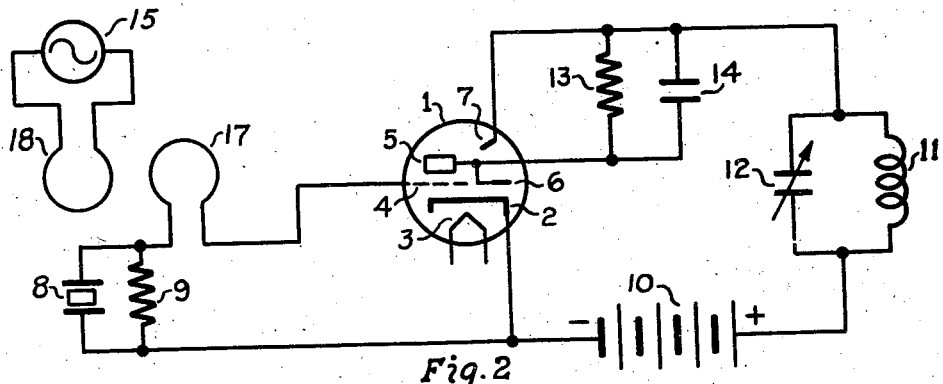
Figure 2 is a schematic diagram of an alternative form of the invention.

In Figure 2, a different method of transferring energy from the source 15 to the oscillating circuit is shown. The vacuum tube 1 having the same elements as previously enumerated, is employed. The piezo-electric resonator 8 and the grid leak resistor 9 are connected in parallel, and this combination is connected between the control grid 4 and the cathode 2 in series with the coupling coil 17. Inductively coupled to coil 17 is a coil 18 which is connected to the source 15, whose frequency is to be tested or adjusted. The parallel resonant circuit comprising inductance 11 and variable capacitance 12 is connected between the positive terminal of the source 10 and the target 7, while the voltage dropping resistor 13 and bypass condenser 14 are connected in parallel from target 7 to the anode 5.

The operation of the crystal oscillator takes place in the manner already described. With the source 15 connected as shown in Figure 2 and supplying a frequency differing from the crystal frequency, the oscillating voltage on the control grid is alternately reinforced and opposed, thus giving rise to anode current variations at the beat frequency between the two frequencies. As before, the ray control potential is correspondingly varied, resulting in a fluctuating shadow pattern. Observation of this pattern enables the determination of or adjustment to isochronism between source 15 and the crystal oscillating frequency. The presence of oscillatory voltage on the target 7 has been found to leave the operation of the indicator substantially unaffected.

Figure 3:
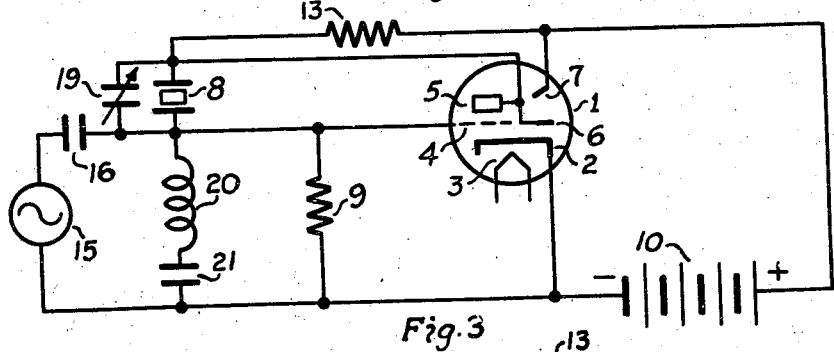
Figure 3 is a schematic diagram of another alternative form of the invention.

Turning now to Figure 3, the invention is shown applied to an oscillator circuit frequently referred to as the Pierce circuit, with some modifications in the grid circuit. The vacuum tube 1 having the same elements previously enumerated is employed. The target 7 is connected to the positive terminal of the source 10, and the anode 5 is connected to the target 7 through the resistor 13. The grid leak resistor 9 is connected between control grid 4 and the cathode 2, while the piezo-electric resonator 8 is connected between the control grid 4 and the anode 5 in parallel with the variable capacitor 19. The series combination of inductance 20 and capacitance 21 is also connected between the control grid 4 and the cathode 2, which is connected to the negative terminal of the source 10. A suitable value for inductance 20 is 1 millihenry, and for capacitance 21 is 1 mfd. Source 15 is coupled to the control grid 4 through the capacitor 16 as previously described.

The operation of the triode section as an oscillator takes place in the well known manner, sustained oscillation of the piezo-electric resonator 8 occurring by virtue of the capacitive nature of the anode load. The frequency of oscillation may be varied by adjustment of capacitor 19, which may be provided with a cooperating pointer and scale calibrated in terms of the oscillating frequency for any position of the capacitor. When source 15 has a frequency differing from the oscillating frequency of the triode section of vacuum tube 1, energy is alternately added to and subtracted from the oscillating circuit causing periodic fluctuations in the oscillation amplitude. An oscillator of the grid leak type is possessed of a self-stabilizing characteristic as a result of two effects which oppose each other. An increase in oscillation amplitude taken by itself would cause an increase in anode current, but an increase in oscillation amplitude gives rise to additional grid current and consequent additional bias with the result that the oscillation amplitude returns to nearly the former value and the anode current suffers a decrease in amplitude. Inductance 20 is selected to present high impedance to radio frequency currents and low impedance to audio frequency currents, and the capacitor 21, which is connected in series with it, is chosen to provide a fairly large time constant in conjunction with the grid leak resistor 9. The capacitor 21 diminishes the grid bias variations and the audio or sub-audio frequency voltage appearing across the resistor 13 is thereby greatly increased with an attendant increase in the sensitivity of indication, as the short-term, self-stabilizing action of the oscillator has now been eliminated, so that an increase in oscillation amplitude brings about a considerable increase in anode current and vice versa. As before, the beat frequency voltage appearing on the ray control electrode makes the shadow width on the target 7 vary periodically. By adjustment of the capacitor 19, the oscillation frequency of the triode section may now be adjusted to zero beat with the source 15 by observation of the shadow pattern, and when isochronism has been attained, the frequency of the source 15 may be immediately obtained by reference to the required setting of the capacitor 19.

Figure 4:
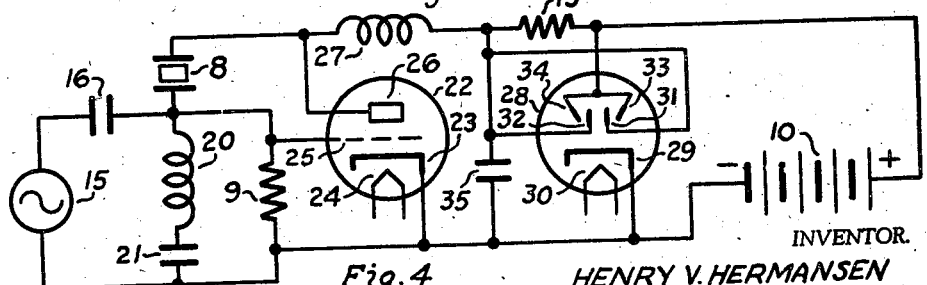
Figure 4 is a schematic diagram of still another alternative form of the invention.

The schematic diagram of Figure 4 shows the invention as practiced using two separate vacuum tubes, the difference between this and the preceding diagram residing in the elimination of radio frequency potentials from the ray control electrode. In this embodiment, the vacuum tube 22 is utilized as an oscillator with the piezo-electric resonator 8 connected between the anode 26 and the control grid 25 thereof. The resistor 9 connected between the control grid 25 and the cathode 22 provides a direct current grid return and the condenser 21 connected across resistor 9 in series with the radio frequency choke 20 acts to delay the rate of change of voltage across resistor 9 as outlined in the discussion of Figure 3. The source of unknown frequency 15 is connected to the control grid 25 through the coupling capacitor 16 and the energy conveyed thereby serves to modify the operation of the oscillator circuit for the purposes of frequency comparison. The anode 26 is connected to the other terminal of the piezo-electric resonator 8 and to the choke 27 having high impedance to oscillation frequencies and low impedance to audio and sub-audio frequencies. The other terminal of choke 27 is connected to the positive terminal of the source 10 through the resistor 13. The indicator tube 28 includes the cathode 29 with associated heater 30, twin ray control electrodes 31, 32, and the twin phosphor coated targets 33, 34 which are connected to the positive terminal of the source 10. The ray control electrodes 31, 32 are connected to the common terminal of the resistor 13 and the choke 27, and radio frequency voltages are eliminated from this point by the bypass capacitor 35 connected between the ray control electrodes 31, 32 and ground. A capacitor of .01 mfd. has been found satisfactory in the position of capacitor 35. The cathodes 23 and 29 are both connected to the negative terminal of the source 10. The vacuum tube 22 may be of the type known commercially as 6J5, and the commercial type 6AD6 may be employed in the position of vacuum tube 28.

The operation of the apparatus of Figure 4 is substantially identical with that of Figure 3, the separation of the indicator and oscillator tubes enabling the removal of oscillation voltage from the ray control electrode with resultant improvement in the sharpness of the target shadow pattern.

Time constant, as referred to in this description and in the claims, is numerically equal to the product of circuit resistance in ohms by the circuit capacity in farads, and is expressed in seconds.

It is also considered that a single cathode, different portions of which supply electronic emission to different sets of elements, is the equivalent of a number of separately constituted and heated cathodes which are operably connected.

It will be obvious that many changes and modifications may be made in the invention without departing from the spirit thereof as expressed in the foregoing description and in the appended claims:

What I claim is:

1. The combination of an oscillatory system comprising a source of sustained oscillations, said system including an electric discharge device having input and output electrodes, means for impressing alternating current energy from a second source on said oscillatory system, a second electric discharge device having a cathode, a ray control electrode and a phosphor coated target, a connection between said output electrode and said ray control electrode, and an envelope common to both of said electric discharge devices.

2. In combination, an electric discharge device having a cathode, a control grid and an anode, a power source having positive and negative terminals, an electromechanical resonator connected between said control grid and said cathode, a resistance connected between said control grid and said cathode, an impedance inductive at the frequency of oscillation of said electromechanical resonator connected between the positive terminal of said source and said anode, a circuit element offering high impedance to audio and sub-audio frequency variations connected in series with said inductive impedance, a connection between said cathode and the negative terminal of said source, a second electric discharge device having a cathode, a ray control electrode and a phosphor coated target, a connection between said first mentioned cathode and said second mentioned cathode, a connection between said anode and said ray control electrode, a connection between the positive terminal of said source and said target, an independent source of alternating current energy, and means for impressing energy from said independent source on said electromechanical resonator.

3. In combination, an electric discharge device having a cathode, a control grid and an anode, a power source having positive and negative terminals, an electromechanical resonator connected between said control grid and said anode, a high impedance connected between said control grid and said negative terminal, a high impedance connected between said anode and said positive terminal, a connection between said cathode and said negative terminal, a second electric discharge device having a cathode, a ray control electrode and a phosphor coated target, a connection between said first mentioned cathode and said second mentioned cathode, a connection between said anode and said ray control electrode, a connection between the positive terminal of said source and said target, an independent source of alternating current energy, and means for impressing energy from said independent source on said electromechanical resonator.

4. In combination with a vacuum tube oscillator having an anode, a control grid and a cathode, a circuit comprising resistance and capacity in parallel having a time constant greater than one twenty-fifth of a second connected in the direct current circuit between said control grid and said cathode, an impedance to audio and sub-audio frequencies connected in series with the anode circuit of said oscillator, a visual indicator responsive to frequencies lower than twenty-five cycles per second connected to said impedance, an independent source of alternating current energy, and means for impressing energy from said independent source on the control grid of said oscillator.

5. The combination of an electric discharge tube having a cathode, a control grid and an anode, a piezo-electric resonator connected to said control grid, a resistance connected between said control grid and said cathode, a series combination of inductance and capacitance connected between said control grid and said cathode, said inductance having an impedance high to the natural frequency of said piezo-electric resonator and low to audio frequencies, said resistance and capacitance having a time constant greater than one twenty-fifth of a second, a visual indicator responsive to frequencies lower than twenty-five cycles per second connected to an element of said electric discharge tube, an independent source of alternating current energy, and means for impressing energy from said independent source on the control grid of said electric discharge tube.

6. The combination of an electric discharge tube having a cathode, a control grid and an anode, a piezo-electric resonator connected to said control grid, a resistance connected between said control grid and said cathode, a series combination of inductance and capacity connected between said control grid and said cathode, said inductance having an impedance high to the natural frequency of said piezo-electric resonator and low to audio frequencies, said resistance and capacity having a time constant greater than one twenty-fifth of a second, an impedance to audio and sub-audio frequencies connected in series with the anode circuit of said tube, a visual indicator responsive to frequencies lower than twenty-five cycles per second connected to said impedance, an independent source of alternating current energy, and means for impressing energy from said independent source on the control grid of said electric discharge tube.

7. In frequency measuring apparatus, an oscillator including an electric discharge device having a cathode, a control grid and an anode, a source of direct current energy having positive and negative terminals, a resistor and an inductor connected in series between said positive terminal of said source and said anode, said inductor being connected to said anode and said resistor being connected to said positive terminal, a second electric discharge device having a cathode, a ray control electrode and a phosphor coated target, means connecting said ray control electrode to the junction between said resistor and said inductor, means connecting said second mentioned cathode to said first mentioned cathode, means connecting said target to said positive source terminal, a capacitor connected between said ray control electrode and the cathode of said second mentioned electric discharge device, a source of alternating current energy, and means for impressing energy from said alternating current source on an element of said first mentioned electric discharge device.

HENRY V. HERMANSEN.